(No Model.)
E. H. RYON.
SPINNING MACHINE SPINDLE.
No. 597,691. Patented Jan. 18, 1898.
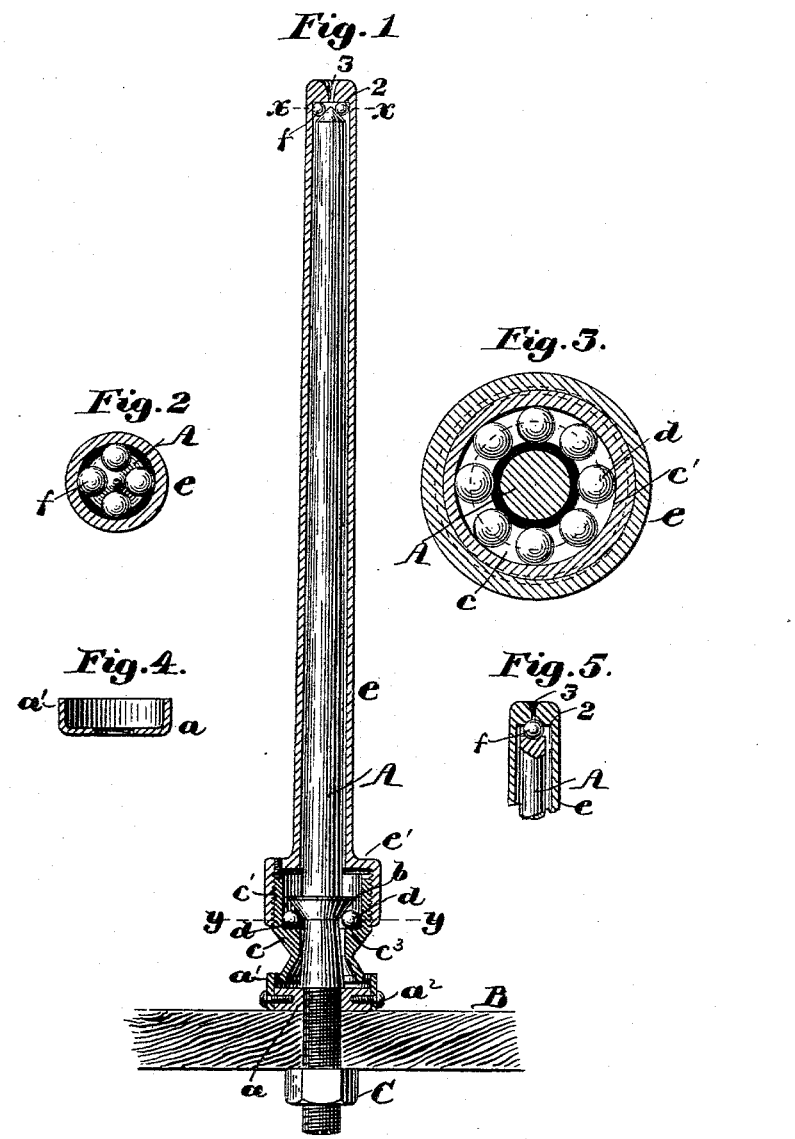
Witnesses:
Walter E. Lombard
Thomas J. Drummond
Inventor:
Eppa H. Ryon,
by Crosby & Gregory,
Attys

UNITED STATES PATENT OFFICE.

EPPA H. RYON, OF WALTHAM, MASSACHUSETTS, ASSIGNOR OF ONE-HALF TO ALFRED M. GOODALE, OF SAME PLACE.

SPINNING-MACHINE SPINDLE.

SPECIFICATION forming part of Letters Patent No. 597,691, dated January 18, 1898.

Application filed December 17, 1896. Serial No. 615,986. (No model.)

*To all whom it may concern:*

Be it known that I, EPPA H. RYON, of Waltham, county of Middlesex, State of Massachusetts, have invented an Improvement in Spinning-Machine Spindles, of which the following description, in connection with the accompanying drawings, is a specification, like letters and figures on the drawings representing like parts.

This invention in spinning-machines has reference more particularly to the class of machines wherein a ring and traveler carried by a ring-rail is used; and this invention has for its object the employment of a dead rather than a live spindle, and to do this I have devised a dead-spindle and have surrounded it with a hollow tube provided with a whirl, the sleeve and spindle being separated by means of balls or rolling bearings. A sleeve of this kind may be rotated rapidly with but the minimum of power and friction, and with it a longer cop can be made than is practicable with a rotating spindle.

Figure 1 shows a dead-spindle with a sleeve thereon in section mounted to illustrate one form of this invention; Fig. 2, a section in the line $x$; Fig. 3, a section in the line $y$; Fig. 4, a modified form of collar, and Fig. 5 a modified construction to be referred to.

The spindle A has its shank extended through a rail B and there fastened by a suitable nut C, applied to a threaded part of the shank. The shank also has screwed upon it a collar $a$, provided with a flanged rim $a'$, secured by suitable screws $a^2$, or instead the flanged rim may be in one piece, as shown in the detail, Fig. 4.

The spindle is provided with a conical flange $b$, it being made integral therewith or applied thereto in any usual manner.

The spindle is surrounded near the rail by a whirl $c$, having an upwardly-extended sleeve $c'$, inside of which is a shoulder $c^3$, which serves to sustain a series of balls or rolling-surfaces $d$, said balls being interposed between said shoulder and said cone.

The outer portion of the sleeve $c'$ is shown as threaded, and on the said sleeve I screw the threaded end of the sleeve $e$, it presenting a shoulder at $e'$, against which may rest the lower end of the bobbin or a paper tube, which may be applied to the sleeve, onto which to wind the thread being spun. The upper end of the sleeve has a shoulder 2, between which and the top of the spindle I apply a second set of balls or rolling surfaces $f$, and if it be desired to lubricate the contacting portions at the upper end of the spindle I may apply oil in the oil-hole 3.

The interior of the tube, as shown, does not contact with the spindle at any point; but the entire weight of the sleeve and the strain due to the band pull is sustained by the balls or rolling surfaces.

Instead of a series of balls between the top of the spindle and the sleeve I may use one ball, as shown in Fig. 5.

Having described my invention, what I claim, and desire to secure by Letters Patent, is—

1. A dead-spindle provided with a conical surface extended outwardly therefrom, a sleeve surrounding said spindle loosely, a whirl movable with said sleeve, a ball-seat, means to adjust said ball-seat with relation to said sleeve, and a series of balls interposed between said ball-seat and said conical surface, to operate, substantially as described.

2. A dead-spindle provided with a conical surface extended outwardly therefrom, a sleeve surrounding said spindle, an adjustably-connected whirl, a ball-seat, and a series of balls interposed between said seat and said conical surface, to operate, substantially as described.

In testimony whereof I have signed my name to this specification in the presence of two subscribing witnesses.

EPPA H. RYON.

Witnesses:
WILLIAM H. JOHNSON,
CAROLINE M. JACOBSEN.